United States Patent [19]

Hall

[11] 4,135,789
[45] Jan. 23, 1979

[54] SEAL FOR LIQUID CRYSTAL DISPLAY

[75] Inventor: James K. Hall, Scottsdale, Ariz.

[73] Assignee: Beckman Instruments, Inc., Fullerton, Calif.

[21] Appl. No.: 812,201

[22] Filed: Jul. 1, 1977

[51] Int. Cl.² .......................... G02F 1/01; C09K 3/34; B32B 3/26; B32B 27/00
[52] U.S. Cl. ........................................ 350/343; 428/1; 428/63; 428/422
[58] Field of Search .......... 428/1, 34, 63, 422, 428/421, 432, 433; 29/522 R; 53/42, 43; 350/160 LC, 343; 65/42, 43, 50, 58

[56] References Cited
U.S. PATENT DOCUMENTS

| | | | |
|---|---|---|---|
| 2,683,906 | 7/1954 | Nevins | 65/43 X |
| 2,749,579 | 6/1956 | Shaw | 65/43 X |
| 3,871,746 | 3/1975 | Muto et al. | 428/1 X |
| 3,926,502 | 12/1975 | Tanaka et al. | 428/1 X |

*Primary Examiner*—George F. Lesmes
*Assistant Examiner*—Daniel R. Zirker
*Attorney, Agent, or Firm*—R. J. Steinmeyer; F. L. Mehlhoff; William H. May

[57] ABSTRACT

A hermetic glass seal to provide the final seal for the fill ports in the glass walls of a display device such as a liquid crystal display. The seal utilizes a glass bead sandwiched between a metal cover and a polymeric separator.

14 Claims, 3 Drawing Figures

SEAL FOR LIQUID CRYSTAL DISPLAY

BACKGROUND OF THE INVENTION

The present invention relates to liquid crystal displays and, more particularly, to an improved arrangement for sealing apertures in the glass walls of such displays.

In the manufacture of liquid crystal displays the liquid crystal material is contained within a glass enclosure formed by sealing a pair of spaced glass plates at their periphery to leave an inner cavity there between. The liquid crystal material is inserted into this cavity through one or more fill ports in one of the glass plates. The insertion of the liquid crystal material is one of the final steps in the manufacture of a liquid crystal display to avoid overheating as well as possible decomposing of the liquid crystal during heat-sealing of the glass plates.

Once the liquid crystal material is in place, it is necessary to provide a relatively strong seal for the fill ports with the seal matched to the characteristics of the surrounding glass enclosure.

Although it is common to seal glass liquid crystal display enclosures with plastic (hydrocarbon) sealants, a glass seal is generally preferred for demanding service specifications and for long-life designs. A glass seal is more readily matched in thermal expansion characteristics with the glass enclosure and is relatively inert chemically, so that it is unlikely to react adversely with the liquid crystal contents. However, because of problems related to the overheating and/or chemical contamination of the liquid crystal, no glass seal design has proved practical and commercially feasible. The present invention is directed toward providing such a commercially acceptable glass seal and, surprisingly, with the use of relatively inexpensive, readily available, easily processed sealant components.

Several problems contribute to the present inability to develop an acceptable glass bead seal which could be heated within the fill port to melt and bridge the port. Some related obstacles are the possibility of overheating the liquid crystal within the cell and degrading its characteristics as well as developing bubbles and deleterious gas emissions and seal-pressures therefrom. Also certain evolving by-products may react adversely with the crystal.

Glass bead sealing techniques involve heat distribution problems. Ideally, the heat necessary to melt and fuse the bead should be confined to the bead alone and not be allowed to spread to the surrounding glass and/or the liquid crystal. This conserves heat as well as avoids damaging the cell. The present state of the art discloses no practical means of achieving this.

SUMMARY OF THE INVENTION

This invention provides an improved glass sealing arrangement for fill ports or similar apertures, display devices such as a liquid crystal display. The aperture in a glass side-wall may be sealed quite effectively in a simple and inexpensive manner. In a preferred embodiment of the invention a glass bead is used with characteristics matched to the surrounding glass wall and adapted to be inserted into the wall aperture. The bead is fused within the aperture together with an inner resilient pad of a chemically inert and thermally insulative material. Preferably an outer metal cap is also included on the bead for concentrating fusing heat on the bead during fusion-sealing.

The chemically inert and thermally insulative pad which is preferably made of a common low-conductivity polymeric material is disposed inwardly of the glass bead to isolate the bead from the crystal and prevent, or at least reduce an adverse effect on the liquid crystal material. An outer metal cap is provided on the glass sealing-bead and heated by induction, or other suitable means, to provide heat-focusing and fuse the bead in situ without damage to the surrounding glass or liquid crystal. Moreover, such a heat-focusing means is well adapted for combination with heat-isolating means like the above-mentioned pad.

Thus, it is an object of the present invention to provide an improved glass seal adapted to ameliorate at least some of the above-mentioned difficulties and to provide the foregoing features and advantages. A related object is to provide such a glass seal for hermetic sealing of apertures in glass walls.

Yet another object is to provide such a seal for fill ports through glass wall portions of liquid crystal displays to increase the reliability and service life of the display. Still another object is to provide such glass sealing arrangements in the manufacture of liquid crystal display cells, so that the liquid crystal is not adversely affected by the glass sealing heat or by associated chemical by-products. Still another object is to provide a related glass sealing method which is well suited to high-volume and low-cost techniques for manufacturing liquid crystal displays.

DETAILED DESCRIPTION OF THE INVENTION

Figure 2:
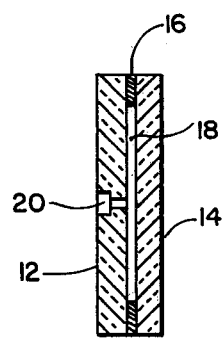
FIG. 2 is a sectional view showing the enclosure assembled.

A typical glass enclosure 10 used to contain the liquid crystal film of a liquid crystal display is shown in FIG. 2 as comprising a pair of relatively flat transparent glass plates 12 and 14. A peripheral seal means 16 serves not only to establish a uniform gap between plates 12 and 14, but also to seal them at their periphery according to known glass-fusion techniques. The plates 12 and 14 in conjunction with the seal means 16 form an inner cavity 18 adapted to receive the liquid crystal film. This peripheral seal 16 is typically comprised of a relatively low-melting-temperature sealing glass as well as non-melting spacer means, such as compatible glass beads or the like, as known in the art. Thus, heat-fusion of this sealing glass will not unduly soften the glass plates 12 and 14 which have a higher melting temperature but it will form a glass seal relatively closely matched therewith in thermal expansivity.

Cavity 18 presents a relatively narrow gap of uniform width of approximately one half to about 30 mils between plates 12 and 14. This gap or cavity 18 is adapted to be completely filled with the liquid crystal material. In the case of a liquid crystal display it will also be understood to include electrodes and associated, field means adapted to be selectively applied across image-portions of cavity 18 so as to generate display symbols by means not shown, but well known in the art.

Figure 1:
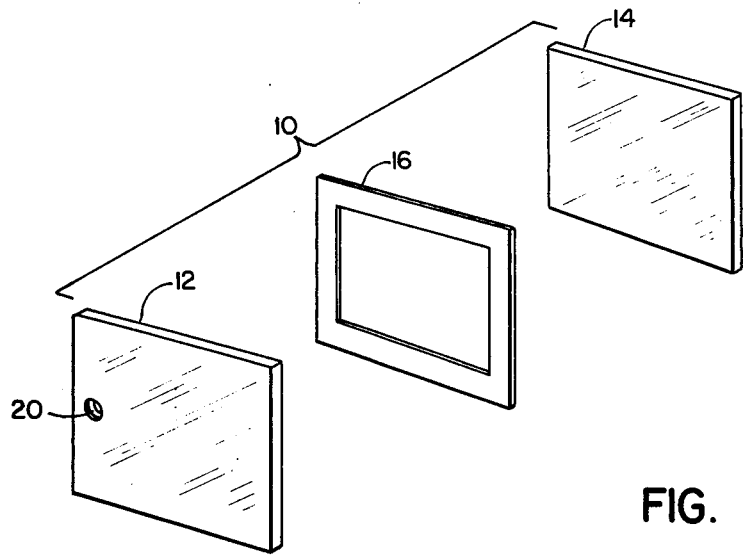
FIG. 1 is an exploded perspective view of a typical liquid crystal display enclosure.

One, or several, fill-ports 20 are typically provided through the cross-section of the glass enclosure as shown in glass plate 12 in FIGS. 1 and 2. Such ports allow the liquid crystal to be inserted into cavity 18 after the glass enclosure has been fabricated. After insertion of the liquid crystal material, fill-port 20 is then sealed permanently and hermetically to preferably form an integral part of the glass wall through which it extends.

Figure 3:
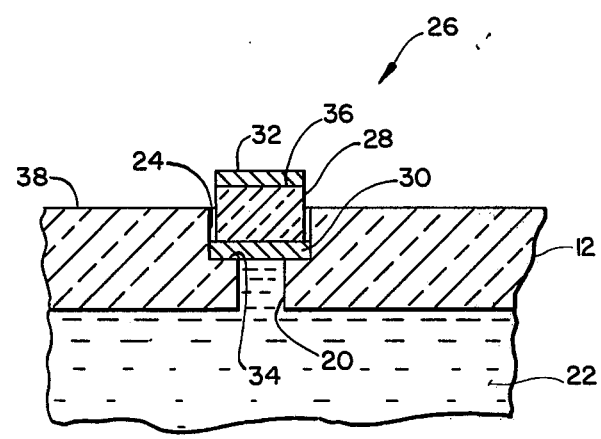
FIG. 3 is an exploded, partial sectional view of the fill port section of a liquid crystal display with the glass sealing means of the present invention.

According to a preferred embodiment, a glass sealing arrangement for a fill-port 20 is indicated in FIG. 3. A typical liquid crystal display glass enclosure of the type described above is shown in FIG. 3 together with the liquid crystal material 22 filling the enclosure or cavity 18. A fill-port 20 is shown as extending through glass wall 12 and having an enlarged counterbore portion 24.

According to this embodiment, an improved port seal 26 comprises a glass bead 28 sandwiched between an associated isolation pad 30 and a heat-focusing metal cap 32 disposed on the bead opposite pad 10. This array is inserted in the enlarged portion 24 of fill-port 20.

The isolation pad 30 preferably comprises a polymeric low-conductivity resilient disc or gasket inserted fully into the enlarged outer portion 24 of fill-port 20 to form the inner or crystal-contacting portion of the resulting glass seal arrangement. The glass bead 28 is next inserted against pad 30 and the conductive metal disc 32 is disposed over the bead 28.

Glass bead 28 will preferably comprise a glass having a softening temperature substantially below that of the surrounding glass wall 12, which in this illustrative case comprises a soda-lime-silica type glass which softens at about 600° C. Accordingly, bead 28 should have a softening point in the range, preferably, of about 300°–500° C.

Bead 28 also preferably comprises a glass exhibiting a relatively low viscosity when melted, so that it is relatively fluid to fill the port diameter and sealingly bond therein at temperatures above its softening temperature. Thus, when the bead is heated to the fusing state, the bead glass will flow readily and fill the enlarged port portion 24 and fuse intimately with the surrounding glass side walls. This will form the desired hermetic integral seal and block the passage of contaminants and/or crystal along port 20. The bead 28 does not have to be bonded to pad 30. The pad 30 is preferably constructed and arranged to block passage of any liquid glass or crystal as well as isolating these from one another.

Glass bead 28 should also be selected to have a thermal expansion closely matched to that of the surrounding glass wall 12. Glass plate walls for liquid crystal displays commonly comprise a soda-lime-silica glass such as Corning Glass No. 1770 or the equivalent, having a coefficient of thermal expansion on the order of 82 × 10$^{-7}$/° C. Some typical glasses found suitable for glass bead 28 when used with such a glass wall 12, having the mentioned characteristics, are indicated by trade designation in Table I below. Table II shows the related glass mixtures being indicated by chemical composition in weight %.

Table I - "Bead Glass"

| Trade Designation | Softening Temp. (° C) | CTE(Coeff.Thermal Expansion per ° C) |
|---|---|---|
| Owens-Illinois 1158 | 470 | 83 × 10$^{-7}$ |
| Owens-Illinois 0564 | 460 | 83 " |
| Owens-Illinois 0766 | 435 | 87 " |
| Corning 7575 | 450 | 80–90 " |
| Corning 7583 | 485 | 65–80 " |
| Pemco Pb-83 | 560 | 82 " |

Table II - "Bead Glass": (wt. %)

| Mix: | "A" | "B" | "C" | "D" |
|---|---|---|---|---|
| PbO | 80.0 | 83.0 | 77.5 | 80.0 |
| B$_2$O$_3$ | 10.0 | 10.0 | 7.5 | 6.5 |
| SiO$_2$ | 5.0 | 4.0 | 2.5 | 2.5 |
| ZnO | | | 10.0 | 10.0 |
| Al$_2$O$_3$ | 5.0 | 3.0 | 2.5 | 1.0 |

The glass beads may be fabricated by conventional powder-sintering techniques, for instance, with the glass material being provided in the form of a fine powder. This powder can either be purchased or custom-ground as well known in the art.

This powder may be pressed and sintered, as known in the art, in a closed metal die to the shape and density desired. Preferably, bead 28 is formed into a relatively cylindrical shape, with dimensions adapted to nearly fill the enlarged port portion 24. The pressed bead is then sintered in a furnace at a temperature somewhat below its softening temperature to cause the bead to shrink somewhat and increase in density to make it stronger and more susceptible to handling and manipulation during the sealing processes.

The isolation pad 30 is an important aspect of the invention and considerable care and attention should be devoted toward providing a proper isolation pad for the glass seal arrangement. Pad 30 in the embodiment of FIG. 3 comprises a polymeric disc or cylinder of suitable dimensions to fill the inner area of the enlarged portion 24 of port 20 sealingly. The pad is preferably slightly over-sized in diameter and adapted to resiliently engage side walls of the portion 24 in port 20. For the subject embodiment it has been found preferable to use a TFE type Teflon disc having a diameter sufficient to frictionally contact and fill the inner area of the enlarged outer portion 24 of port 20 when seated against the shoulder 34. The pad 30 should have sufficient thickness with respect to the thermal impedance desired and resilience to frictionally engage the port side walls. Preferably, the pad 30 is comprised of a high temperature elastomer such as Teflon (tetrafluoroethylene). Altenratively a chlorinated hydrocarbon (e.g. Kel-f), a silicon rubber, or other like material will serve. Such resilient high temperature polymers will be understood as capable of withstanding the head used for fusing glass bead 28 in situ. The pad 30 must maintain its structural integrity and insulation. Consequently, the pad must withstand temperatures as high as about 600° C. without being adversely affected. It will be understood that a principal function of pad 30 is to isolate liquid crystal 22 from the heat and from any possibly damaging by-products, associated with the heat-fusing of bead 28 into port 20. Accordingly, it has been found that certain conventional elastomers are not suitable, such as butadiene or a like rubber which will react with or dissolve in the liquid crystal. Similarly, electrochromic filling will characteristically be strongly acidic and dissolve many rubbers.

Typically, the liquid crystal will completely fill the cell cavity 18 as well as much of port 20, as shown in FIG. 3, with no gas bubbles or voids present. The contact pad 30 will be expected to contact the liquid crystal 22 and must be comprised of material fully compatible chemically with the liquid crystal used.

As a supplemental feature, pad 30 is preferably comprised of a very good heat insulator so that, during fusing, a minimum of heat is transferred from the glass bead 28 to the liquid crystal 22. Various means could be used to improve upon the heat-insulator properties of pad 30. For instance, the pad could be made of a polymer foam (e.g. urethane foam). A central gaseous gap or air space could be provided. One might also coat the upper and/or lower surfaces of pad 30, so that it will not react with either the crystal or the glass, and so that it fuses well with the glass and bonds securely to the shoulder 34.

In some instances, other receptacles for the pad may be used, such as an annular depression for receiving an oversized pad.

The pad 30 is designed to isolate the liquid crystal from the glass bead thermally as well as chemically. The heat of fusing the bead would otherwise be expected to decompose or otherwise adversely affect the liquid crystal without such isolation means and also possibly generate harmful crystal vapor which could pressurize and possibly destroy seal integrity.

The dimensions required for bead 28 and pad 30 can be made to conform to the particular shape and size of the filler port used. In the case of a glass wall 12 about ⅛ inch thick, with enlarged portion 24 of port 20 having an outer diameter of about ⅛ inch and an outer depth of about 1/6 inch and annular shoulder 34 projecting about 0.02 inch into the wall exterior, it is found suitable to make bead 28 relatively cylindrical about 1/10 inch in diameter and about 0.05–0.06 inch high, with a Teflon pad 10 about 0.025 inch thick, having a diameter slightly greater than the (⅛ inch) outer diameter of the portion 24 of port 20.

Preferably, a metal cap 32 is affixed over the bead 28 in FIG. 3. The cap 32 is intended to concentrate and focus focusing-heat upon the glass bead 28 alone, and minimize dissipation of heat to the surrounding glass wall 12 and the adjacent liquid crystal 22.

Thus, cap 32 may comprise a relatively heat-conductive metal disc arranged and adapted to contact nearly all of the upper surface 36 of bead 28. The cap 32 is heated relatively conveniently, such as by inductive heating means or the like. Being highly conductive, the cap will readily transfer its heat to heat-soften glass bead 28 quickly and efficiently melting it and fusing it in situ to form a part of glass wall 12. The cap 2 is also matched in thermal expansivity closely enough with bead 28 to avoid thermal cracking unless it is to be removed. Thus, as an optimizing feature, it is preferable to select the metal for cap 32 to be matched in thermal expansion properties with the glass of the bead. Otherwise, it may be desirable to remove the cap after fusing by providing it with a coating to prevent wetting and bonding with bead 28. Typical metals preferred for such rapid heat-transfer are nickel alloys, iron, steel and related ferrous alloys, as well as copper, aluminum and silver alloys. It has been found to so provide a cap which may be left in place during service with no harm resulting and enhances the ability to reheat the bead and melt it to reopen port 20 to inspect or replace the liquid crystal.

The metal cap may be pre-attached to the glass bead 28 before the bead is inserted into the enlarged portion 24 of the port 20. Such attachment is preferably effected during the sintering operation, described below.

For the embodiment of FIG. 3 using the recited preferred bead 28 and Teflon pad 30, a cap 32 of "Inco Nickel Alloy No. 46" is preferred having a diameter of about ⅛ inch and a thickness of about 0.005–0.010 inch.

An example will now be given of some preferred techniques for fabricating and sealing the preferred seal embodiment in a fill-port of a display cell of the type described in conjunction with FIGS. 1 and 2. These techniques will be understood as carried out as follows, in conjunction with known methods:

1. The liquid crystal cell is fabricated as known in the art in the form generally indicated in FIGS. 1 and 2 and above described. Then it is filled with liquid crystal, for instance of the Schiff-base type. An enlarged entry fill-port like port 20 in FIG. 3 described above, having an enlarged diameter outer portion 24 will be understood as provided through this glass enclosure.

2. Next, a Teflon disc 30, of the type described for the embodiment of FIG. 3 above, is secured and inserted into the enlarged outer portion 24 of port 20, being seated firmly against the annular shoulder 34 thereof and dimensioned to resiliently engage the side walls of portion 24 in port 20.

3. A generally cylindrical glass bead 28 is conventionally pressed (preferably from Corning No. 7575 glass powder) and is sintered at about 370° C. as generally indicated above, for about five minutes, with an "Inco Nickel Alloy No. 46" disc-shaped cap 32 attached thereto. Cap 32 will be understood as bonding onto bead 28 during sintering, as mentioned above, to form a combined bead/cap having the dimensions and characteristics above recited. This bead/cap is then inserted into the enlarged portion 24 of port 20 atop Teflon disc 30.

4. The enlarged portion 24 of port 20, and the combined cap/bead/gasket 26 indicated above, are then positioned under an induction heater coil as known in the art, so that cap 32 is properly oriented for induction heating as known in the art. A prescribed field is selectively applied, the field intensity and application time being controlled to be sufficient to so heat cap 32 that the heat it transfers to glass bead 28 will quickly soften it, causing it to flow into wetting-contact with the soda-lime-silicate side walls of port 20 and, on cooling, be fused therewith.

5. With heating terminated and the seal array cooled, an improved isolating hermetic glass seal of port 20 results. Cap 32 is preferably disposed to be coplanar with the surface 38 of glass plate 12. Otherwise, it may be removed by cutting or grinding, if desired, after the bead 28 is fused in place.

Of course other means for heating and so fusing glass bead 28 could be used by those skilled in the art, such as with a heating laser beam, or with a focused electron beam or with a simple contact-heater applied to metal cap 32.

Although the above discussion of the present invention has been directed primarily to liquid crystal displays, it should be recognized that the present invention could be applied to several other types of electronic displays. Examples of other types of displays which could utilize the present invention are electrochromic displays, electrophoretic displays, suspended particle displays, and suspended dichroic crystal displays.

It is envisioned that other configurations of the filler port 20 could be used. Possibly a conical shaped port could be utilized as well as an elliptical hole or other noncircular or noncylindrical arrangements. Similarly, the shape of the seal 26 could be other than cylindrical. Possibly its shape could be conical or elliptical.

In any event, the present invention of a unique filler hole seal using a glass bead sandwiched between a metal cap and a polymeric pad may be formed of several configurations to match the configuration of the particular filler hole to provide a hermetic seal on any of a plurality of devices having a glass plate or wall.

What is claimed is:

1. A sealing arrangement for an aperture in a glass wall portion of an enclosure containing a prescribed material, said arrangement comprising:
   a glass bead disposed in said aperture, said glass bead being fused within said aperture; and
   an insulating pad disposed in said aperture between said glass bead and said prescribed material, said pad being chemically inert to avoid adverse chemical reactions when in contact with said glass bead and said prescribed material, said pad being made of a high temperature elastomeric material low in thermal conductivity to impede the transfer of heat to said prescribed material to inhibit prescribed material when said glass bead is being fused within said aperture by an external heat source.

2. The sealing arrangement as defined in claim 1, wherein said prescribed material comprises a liquid crystal and said aperture comprises at least one fill-port extending through a glass wall portion of a liquid crystal display.

3. The sealing arrangement as defined in claim 2, wherein said aperture comprises an enlarged portion defined in depth by an annular shoulder, said pad being seated on said shoulder and said glass bead being seated on said pad.

4. The sealing arrangement as defined in claim 2, wherein said pad is comprised of a high temperature elastomer.

5. The sealing arrangement as defined in claim 4, wherein said elastomer pad comprises an insulating nonreactive polymer.

6. The sealing arrangement as defined in claim 5, wherein said pad is comprised of poly-tetrafluoroethylene.

7. The sealing arrangement as defined in claim 1, wherein said glass bead comprises a glass having a softening temperature below the softening temperature of said adjacent glass wall.

8. The sealing arrangement as defined in claim 1 and additionally comprising means in thermal contact with said glass bead opposite said pad for concentrating said external fusing heat substantially entirely upon said bead.

9. A sealing arrangement for an aperture in a glass wall portion of an enclosure having electrodes and a prescribed material visually responsive to said electrodes, said arrangement comprising:
   a glass bead disposed in said aperture, said glass bead being fused within said aperture; and
   means in thermal contact with said glass bead for concentrating a substantial entirety of the fusing heat from an external heat source on said bead.

10. The sealing arrangement as defined in claim 9, wherein said heat concentrating means comprises a metal cap.

11. The sealing arrangement as defined in claim 10, wherein said cap is affixed on said bead and is comprised of a metal selected and arranged to develop heat from an induction field and to conduct it efficiently to said bead.

12. An improved method for providing a glass seal in apertures through glass wall portions of an enclosure wherein heat and chemical contaminants developed at or adjacent the aperture must be inhibited from reaching and effecting a prescribed material within said enclosure, said method comprising the steps of:
   inserting a pad into said aperture, said pad being selected and constructed to radically impede the passage of said heat and block passage of said contaminants;
   inserting a heat-fusible glass bead into said aperture on said pad; and
   heat fusing said bead in situ to fuse with said bead said aperture.

13. The method as defined in claim 12 and comprising the additional step of inserting a metal cap means on said bead, opposite said pad before said heat fusing step, so that said fusing heat may be efficiently developed at said cap means and be efficiently transferred to said bead alone with minimal waste and dispersion of the heat beyond the bead.

14. A display device comprising:
   a substrate;
   a faceplate sealed in face to face relation with said substrate to form an interior envelope, one of said substrate and faceplate having a fill port in fluid communication with said envelope;
   a prescribed material placed within said envelope, said prescribed material changing its visual characteristics in response to energization of said electrode pattern;
   a glass bead disposed in said fill port, said glass bead being fused within said aperture; and
   an insulating pad disposed in said aperture between said glass bead and said prescribed material, said pad being chemically inert to avoid adverse chemical reactions when in contact with said glass bead and said prescribed material, said pad being low in thermal conductivity to impede the transfer of heat to said prescribed material to inhibit adverse heat effects on said prescribed material when said glass bead is fused within said aperture.

* * * * *